Figure 1:
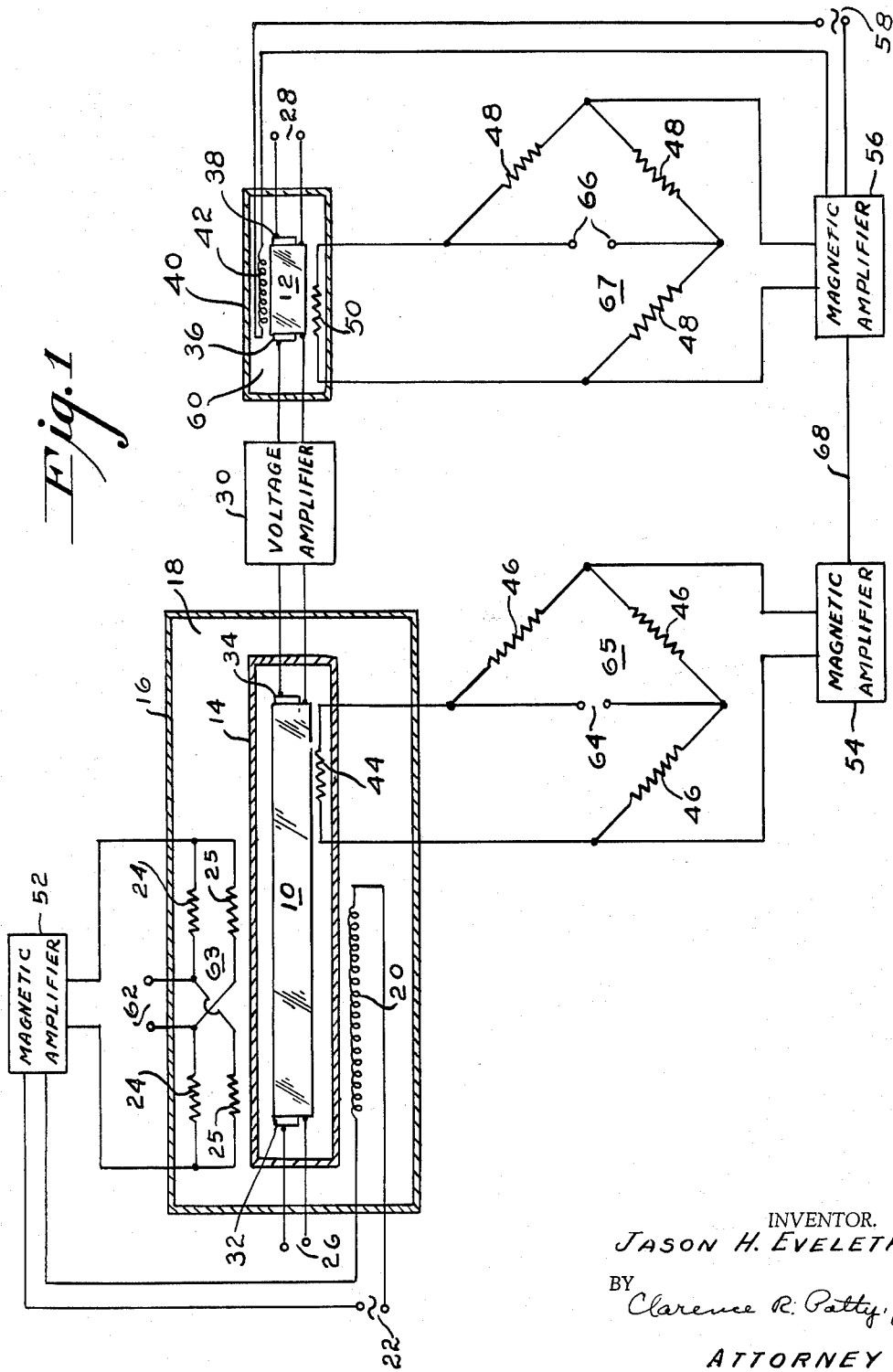

Sept. 28, 1965     J. H. EVELETH     3,209,286
TEMPERATURE STABILIZED ULTRASONIC DELAY LINE
Filed Aug. 18, 1960     3 Sheets-Sheet 1

INVENTOR.
JASON H. EVELETH
BY Clarence R. Patty, Jr.
ATTORNEY

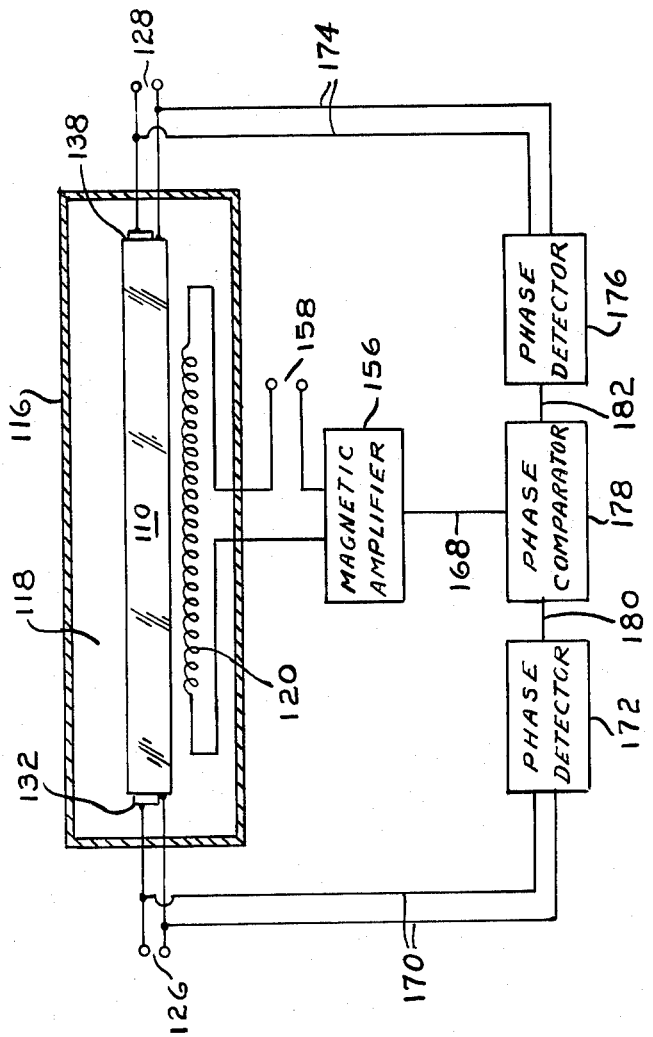

TEMPERATURE STABILIZED ULTRASONIC DELAY LINE

Jason H. Eveleth, Bradford, Pa., assignor to Corning Glass Works, Corning, N.Y., a corporation of New York
Filed Aug. 18, 1960, Ser. No. 50,366
6 Claims. (Cl. 333—30)

This invention relates to ultrasonic delay lines and more particularly to a temperature stabilized ultrasonic delay line.

One of the most widely used applications for ultrasonic delay lines is in the radar receiver art where, for example, for a Moving Target Indication (MTI) device, the delay line is used to delay one received echo or pulse to be compared with a succeeding echo or pulse to thereby determine if there has been any change in the time of the received signal. Another widely used application of ultrasonic delay lines is in the production of radar timing or marker pulses.

In all delay line applications, it has been found that the inherent temperature coefficient of time delay of the delay material will introduce a very great inaccuracy if the temperature of the delay material or the temperature of the complete delay line is not maintained absolutely constant. For delay lines made of fused silica or fused quartz the variation in delay time is approximately $-80$ parts per million per centigrade degree.

It follows then that if a continuous, constant frequency signal is applied to a delay line and the delay line's temperature is allowed to vary, the phase of the output signal will also be altered. For example, the delay time of a 1,000 microsecond fused silica delay line operating in the 10 megacycle range, will be changed at the rate of $-80$ parts per million per centigrade degree or $-0.08$ microsecond per centigrade degree. Since the velocity of sound in a fused silica body is 0.148 inch per microsecond, a change of one centigrade degree in the delay line temperature will correspond to a change of the length of the delay line of 0.01184 inch. The wave length of a 10 megacycle signal is 0.0148 inch. Therefore, the temperature change of 1 degree centigrade corresponds to $$0.01184 \div 0.0148$$

of a wave length, $(0.8\lambda)$ or a phase change of $$\frac{0.01184}{0.0148} \cdot 360° \ (288° \text{ of phase})$$

If a line three times as long is considered at 4 times the frequency, the phase change per degree would then be increased by a factor of 12.

If a prior art 1,000 microsecond delay line is required to be held at a constant delay of $1,000 \pm 0.0008$ miroseconds, that is, within 2.88 degrees of phases at 10 megacycles, then its temperature must be controlled and maintained with an accuracy which may be determined from the following formula:

(1) $$\frac{\Delta D}{T_d \cdot k} = \Delta t$$

Where:
$\Delta D$ = Delay change
$T_d$ = Delay time
$k$ = Coefficient of time delay $(-80 \times 10^{-6})$
$\Delta t$ = Temperature change Substituting 0.0008 mirosecond for D which represents the maximum allowable change in delay time and dividing by 1,000 (delay time $T_d$) and $-80 \times 10^{-6}$ (which represents the coefficient of time delay) and solving for $\Delta t$ (which represents the allowable changes in temperature which will maintain the delay time within the stated limits), it will be seen that the accuracy of the temperature controlling device must be of the order of $\pm 0.01$ degree centigrade. This now requires an extremely sensitive temperature controlling device that is obviously totally unsuited for air-borne equipment, for example.

I have found that if this 1,000 microsecond delay line were split into two parts, one with a delay time of 990 microseconds and the other with a delay time of 10 microseconds and each part controlled separately, the total delay time variation due to temperature changes may now be much more easily and accurately maintained and controlled with controlling devices which do not require the accuracy of the prior art devices.

If, for example, it is desired to control and maintain the longer delay line with a temperature controlling device with an accuracy of $\pm 0.1$ degree centigrade, it will be seen from Equation (1) that the delay variation in this section will be $\pm 0.00792$ microsecond. This is derived by solving for $\Delta D$ (the delay change), wherein the delay time, $T_d$, now equals 990, the coefficient of time delay being $-80 \times 10^{-6}$ and the temperature change $\Delta t$ being $0.1°$ C. Assuming, for example, that the longer line is now too cold by $0.1°$ C., its delay time will then be 990.00792 microseconds and the short 10 microsecond delay line must then be heated to a temperature which makes its delay time 9.99208 microseconds. Since this requires the short delay line to change its temperature sufficiently to shorten its delay time by 0.00792 microsecond, we may now substitute in Equation (1) and solve for $\Delta t$, where, the delay change, $\Delta D$, is 0.00792, the delay time, $T_d$, is 10 microseconds, with the same coefficient of time delay as in the prior examples. This then requires that the short delay line be heated to 9.9 degrees centigrade to apply the appropriate compensation to achieve the required total delay time. Thus, I have replaced the single, prior art fine temperature control, which senses and controls the delay line temperature with an accuracy of the order of $0.01°$ C. with two coarser controls, wherein the controlling device of the longer delay line need only sense and control to an accuracy of $0.1°$ C. and the controlling device of the shorter delay line need only control over a range of $10.0°$ C. to an accuracy of $1.0°$ C. This arrangement provides a very accurate, vernier type control, acting on the shorter delay line, due to the fact that it is so small in relation to the longer section it requires large or gross temperature variations to produce a small change in delay time.

Since any change in delay time will produce a phase change in the output signal, any phase changes brought about by a temperature excursion may readily be detected by a phase detector. The detected phase information may thus be used to control the power to heat the delay line and thereby maintain a high order of stability.

Utilizing my device, it is now possible to simplify the overall circuitry and still achieve the same accuracy. It will be obvious to those skilled in the art that once the temperature levels have been set, it then becomes a relatively simple matter to detect changes in temperature from the value preset in the longer delay line and apply the appropriate compensation to the shorter delay line. This may be done by either utilizing bridge network temperature sensors and detecting an unbalance in the bridge network which unbalance represents a change in temperature or by a detected phase change technique.

In accordance with the foregoing, it becomes a principal object of the present invention to provide a temperature stabilized ultrasonic delay line.

Another principal object of the present invention is to provide a temperature stabilized ultrasonic delay line utilizing a pair of coarse temperature controls.

A still further principal object of the present invention is to provide a temperature stabilized ultrasonic delay line utilizing a pair of delay lines having a ratio of time delay varying in the range from about 10:1 to about 1000:1.

A further object of the present invention is to provide a temperature stabilized ultrasonic delay line utilizing a system for detecting changes in temperature of the delay line in which the delay line itself becomes the sensing element.

A still further object of the present invention is to provide a temperature stabilized ultrasonic delay line utilizing a system for detecting changes in temperature of the delay line wherein the temperature variations are detected by comparing changes in signal phase between the delay line input and delay line output signals.

Figure 2:
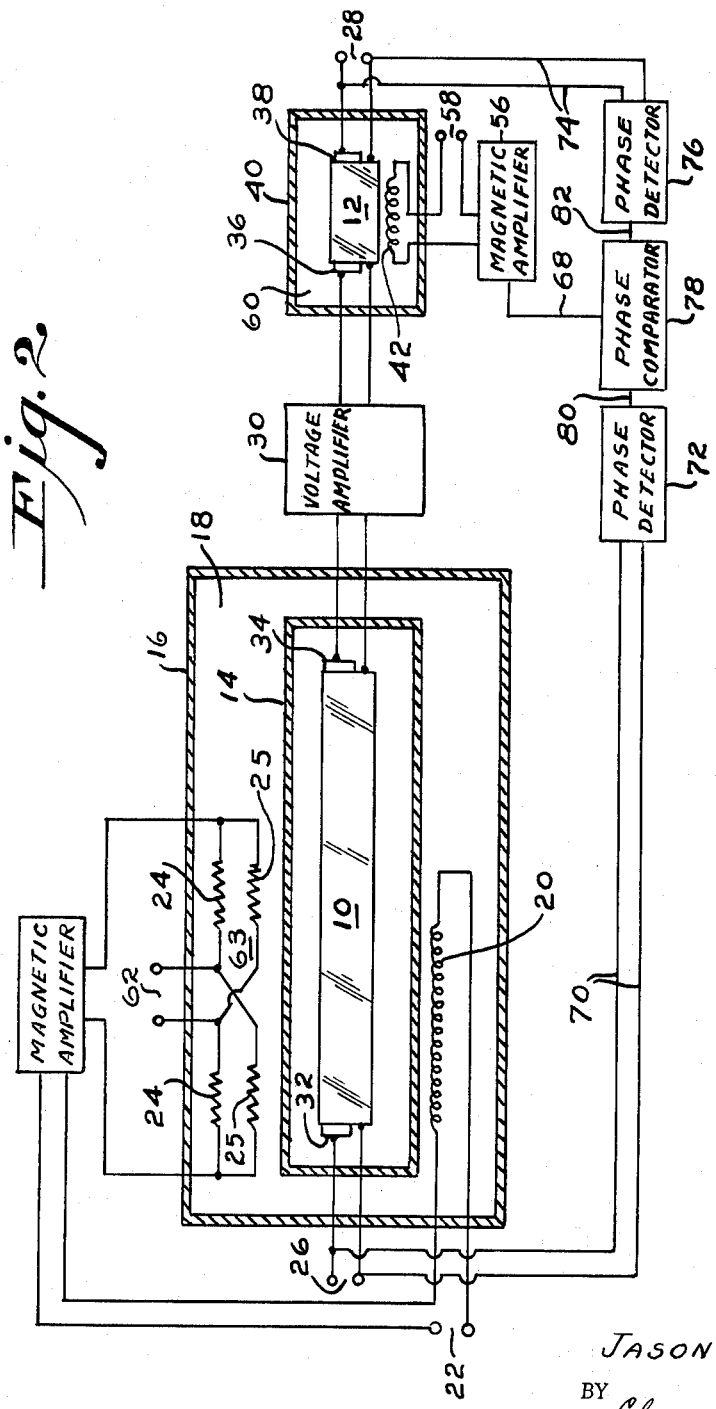

The features of my invention which I believe to be novel are set forth with particularity in the appended claims. My invention itself, however, both as to its organization and method of operation, together with further objects and advantages thereof can best be understood by reference to the following description taken in conjunction with the accompanying drawings in which:

FIG. 1 represents a partial block and schematic representation of one embodiment of my invention utilized in conjunction with a split ultrasonic delay line assembly each section of which is shown in partial section, FIG. 2 represents a block diagram of another embodiment of my invention utilized in conjunction with a split ultrasonic delay line assembly, each section of which is shown in partial section, and FIG. 3 represents a modification of the embodiment of FIG. 2 illustrating the applicability of the detecting feature of my invention to a prior art ultrasonic delay line.

In the following figures it should be noted that the various elements have been somewhat exaggerated for purposes of clarity.

Referring now to FIG. 1, one embodiment of my invention, utilizing, for example, a time delay ratio of 100:1, there is depicted delay lines 10 and 12 in series connection with an intermediate voltage amplifier 30. Insofar as the delay time is concerned, the input signal is applied through terminals 26 to input transducer 32 and is then delayed through delay line section 10 for at least $99/100$ of the total delay time. The signal appearing at output transducer 34 is then applied to voltage amplifier 30 which suitably amplifies the output signal and applies it as an input to transducer 36 of delay line 12 with the proper impedance match. The signal then traverses delay line 12, which represents about $1/100$ the total delay time, and the suitably delayed, temperature stabilized signal appears at output transducer 38 and is available at terminals 28 for use in an appropriate utilization circuit connected thereto (not shown).

Delay line 10 is enclosed within inner case 14 which is enclosed within outer case 16 with a suitable insulating material in the intervening area 18 so that the entire delay line 10 is encased in as perfect an isothermal oven as possible.

Heating element 20, heating power source (not shown) connected to terminals 22, magnetic amplifier 52 and the bridge circuit 63 consisting of a bridge operating potential (not shown) connected to terminals 62, resistors 24 and 25, all constitute the temperature regulating device associated with long delay line 10.

The short delay line 12 is neclosed within case 40 with a suitable insulating material in the intervening area 60. The temperature sensing and regulating means associated with short delay line 12 consists of bridge network 67 having a temperature sensitive resistor 50 and resistors 48. A bridge operating potential (not shown) is connected to terminal 66 which places it across one diagonal of the bridge. Connected across the opposite diagonal of the bridge is magnetic amplifier 56 which has its output connected in series with a heating element 42 and a heating power source (not shown) connected to terminals 58. Magnetic amplifier 54 is connected directly to magnetic amplifier 56 through lead 68.

*Mode of operation*

A source of power is connected to terminals 22 and 58 and the heating elements 20 and 42 are allowed to become heated until the delay lines are stabilized at the operating temperature. Bridge networks 63, 65 and 67 and magnetic amplifiers 52, 54 and 56 associated respectively with the bridge circuits are utilized to maintain the temperatures of delay lines 10 and 12 within a stated temperature range. With suitable operating potentials applied to terminals 62, 64 and 66, it will be seen that any variation in temperature in either delay line 10 or 12 will be detected and controlled by the associated bridge network. Thus, if the temperature of delay line 10 were to rise more than 0.1° C., this rise would be detected by resistor or sensing element 44 in bridge network 65. Since the operating potentials applied to bridge 65 at terminals 64 and the values of resistors 46 and 44 have been chosen to maintain this bridge network in a balanced condition, the rise in temperature, sensed by element 44, produces a classic unbalance voltage to appear and be presented as an input voltage to magnetic amplifier 54. The output of magnetic amplifier 54 is then applied through lead 68 as an input to magnetic amplifier 56 to set the operating level about which magnetic amplifier 56 is to operate. Since the temperature of delay line 10 has risen by 0.1° C. the total delay time through this section will be 989.99208 microseconds (Equation 1) instead of the required 990.00000 microseconds. The output of magnetic amplifier 54 conveys this unbalanced condition information to magnetic amplifier 56 which now determines that network 67 will be balanced when delay line 12 has been cooled sufficiently to achieve a delay sufficient to cause the total delay time to be restored to 1,000 microseconds. Thus, bridge network 67 will remain unbalanced until sensing element 50 determines that delay line 12 has been cooled by 9.9° C. (Equation 1), to produce a delay time of 10.00792 microseconds thereby providing the proper overall delay time. In this particular instance magnetic amplifier 56 prevents any power from reaching heating element 42 thereby allowing the heat to become dissipated through case 40 to cool short delay line 12.

Referring now to FIG. 2 it will be seen that delay lines 10 and 12 are similar in all respects to the delay lines 10 and 12 of the embodiment of FIG. 1. Therefore, like elements in both figures are similarly numbered. However, it should be noted that in this embodiment, bridge sensing network 65 and its associated magnetic amplifier 54, as well as bridge network 67 are deleted. In place thereof, leads 70 connect the input of phase detector 72 to input terminals 26. The output of phase detector 72 is applied as a first input, through lead 80, to phase comparator 78. Similarly, leads 74 connect the input of phase detector 76 to output terminals 28. The output of phase detector 76 is applied as a second input, through lead 82, to phase comparator 78. The output of phase comparator 78 is applied as an input, through lead 68, to magnetic amplifier 56.

*Mode of operation*

Since the phase relation between the input and the output signal may readily be determined for any properly operating delay line operating within the prescribed limits of time delay, any deviation from the proper phase, appearing at terminals 28 may now be attributed to a temperature change. Thus, the input signal, in addition to being applied to transducer 32, is also applied to phase detector 72, where its phase is accurately determined. Similarly, the output signal, appearing at terminals 28, in addition to being applied to a utilization circuit is also applied through leads 74 to phase detector 76, where its phase is accurately determined. The output of each phase detector is then applied to a phase comparator 78 which determines whether or not the phase of the output signal is in proper phase relationship with the input signal phase. If the output phase is correct, there is no output from comparator 78 and magnetic amplifier 56 has no input applied thereto. Delay line 12 now operates at the predetermined temperature set by the parameters of magnetic amplifier 56. However, if the phase of the output signal appearing at terminals 28 has varied sufficiently from a prescribed minimum, then the variation is detected in phase comparator 78 and manifests itself as a difference voltage. This difference voltage is applied as a biasing voltage through lead 68 to magnetic amplifier 56 which controls heating element 42. This heating element appropriately allows delay line 12 to cool by not supplying heat thereto and allowing any heat to dissipate through case 40. In the alternative, when required, heating element 42 heats delay line 20 to achieve the proper compensation.

Referring now to FIG. 3, there is presented a unitary delay line 110 as distinguished from the split delay lines of the prior embodiments. In this embodiment, I have depicted a manner in which a unitary delay line may be accurately controlled utilizing the controlling and detecting mechanism of FIG. 2.

As in FIG. 2, the input signal applied to input terminals 126 and transducer 132 is also applied through leads 170 to phase detector 172. The output of phase detector 172 represents the input, through lead 180, to phase comparator 178. The output signal from transducer 138 appearing at terminals 128 is also applied through leads 174 to phase detector 176. The output of phase detector 176 represents the input, applied through lead 182 to phase comparator 178. The output of phase comparator 178 is applied through lead 168 to magnetic amplifier 156 which controls heating element 120. Heating element 120 is incased with delay line 110 in intervening space 118 within case 116.

*Mode of operation*

A source of power is connected to terminals 158 and the heating element 120 is allowed to become heated until delay line 110 has become stabilized at its operating temperature. In this embodiment too, the phase relation of the input and output signals are readily determined by their respective phase detectors 172 and 176. Any deviation of the output signal from a prescribed minimum is detected in phase comparator 156 and manifests itself as a difference of voltage. This difference voltage is applied as a biasing voltage through lead 168 to magnetic amplifier 156 which controls the power applied to heating element 120. Heating element 120, magnetic amplifier 156, phase detectors 172 and 176 and phase comparator 178 all cooperate in the same manner as previously described with regard to FIG. 2.

While I have described what is presently considered a preferred embodiment of my invention, it will be obvious to those skilled in the art that various changes and modifications may be made therein without departing from the inventive concept and it is, therefore, aimed in the appended claims to cover all such changes and modifications as fall within the true spirit and scope of my invention.

What is claimed is:

1. A stabilized ultrasonic delay line system comprising first and second delay lines in series connection, means for individually regulating a given operating condition for each delay line, means for sensing changes in said operating condition of the first delay line corresponding to changes from a predetermined value of delay time of the system, said sensing means applying the sensed changes to said regulating means of the second delay line, regulating the second delay line operating condition in accordance with said sensed changes thereby returning the system to said predetermined value of delay time.

2. The stabilized ultrasonic delay line system of claim 1 wherein the ratio of delay time between said first and second delay lines ranges from about 10:1 to about 1000:1.

3. A temperature stabilized ultrasonic delay line system comprising first and second delay lines in series connection, means for individually regulating a given temperature for each delay line, means for sensing temperature changes of the first delay line corresponding to changes from a predetermined value of delay time of the system, said sensing means applying the sensed changes to said regulating means of the second delay line, regulating the second delay line temperature in accordance with said sensed changes thereby returning the system to said predetermined value of delay time.

4. The temperature stabilized ultrasonic delay line system of claim 3 wherein the ratio of delay time between said first and second delay lines ranges from about 10:1 to about 1000:1.

5. A temperature stabilized ultrasonic delay line system comprising first and second delay lines in series connection, means for individually regulating a given temperature for each delay line, input and output terminals connected respectively to the input and output of said delay system, means for detecting the phase of said input signal, means for detecting the phase of said output signal, means comparing the phase of said input signal with the phase of said output signal to derive a difference signal corresponding to changes from a predetermined value of delay time substantially due to changes in temperature of said first delay line, said comparing means applying the difference signal to said regulating means of the second delay line thereby regulating the second delay line temperature in accordance with said difference signal, returning the system to said predetermined value of delay time.

6. The temperature stabilized ultrasonic delay line system of claim 5 wherein the ratio of delay time between said first and second delay lines ranges from 10:1 to about 1000:1.

References Cited by the Examiner

UNITED STATES PATENTS

| 2,099,687 | 11/37 | Hartig. | |
| 2,284,612 | 5/42 | Green | 333—18 |
| 2,755,446 | 7/56 | Gabor | 333—18 |
| 2,760,165 | 8/56 | Sullivan | 333—30 |
| 2,960,571 | 11/60 | Malthaner | 333—18 |

FOREIGN PATENTS

| 781,902 | 8/57 | Great Britain. |
| 813,591 | 5/59 | Great Britain. |

HERMAN KARL SAALBACH, *Primary Examiner.*

ELI J. SAX, *Examiner.*